A. H. FLOURNOY.
VEHICLE WHEEL.
APPLICATION FILED AUG. 11, 1910.

1,036,599.

Patented Aug. 27, 1912.

Witnesses:
Arthur L. Slee
S. Constaine

Inventor:
A. H. Flournoy
by N. A. Acker
his Atty.

UNITED STATES PATENT OFFICE.

ALEXANDER H. FLOURNOY, OF HEALDSBURG, CALIFORNIA.

VEHICLE-WHEEL.

1,036,599.

Specification of Letters Patent.   Patented Aug. 27, 1912.

Application filed August 11, 1910. Serial No. 576,677.

*To all whom it may concern:*

Be it known that I, ALEXANDER H. FLOURNOY, a citizen of the United States, residing at Healdsburg, in the county of Sonoma and State of California, have invented certain new and useful Improvements in Vehicle-Wheels, of which the following is a specification.

The hereinafter described invention relates to that class of vehicle wheels designed to be substituted for the pneumatic tired wheels employed in connection with automobiles and motor driven vehicles; the object of the invention being the production of a puncture proof wheel which shall be simple of construction, durable, inexpensive, and efficient for use wherein wheels of this character are employed.

To comprehend the invention reference should be had to the accompanying sheet of drawings, wherein—

Figure 1:
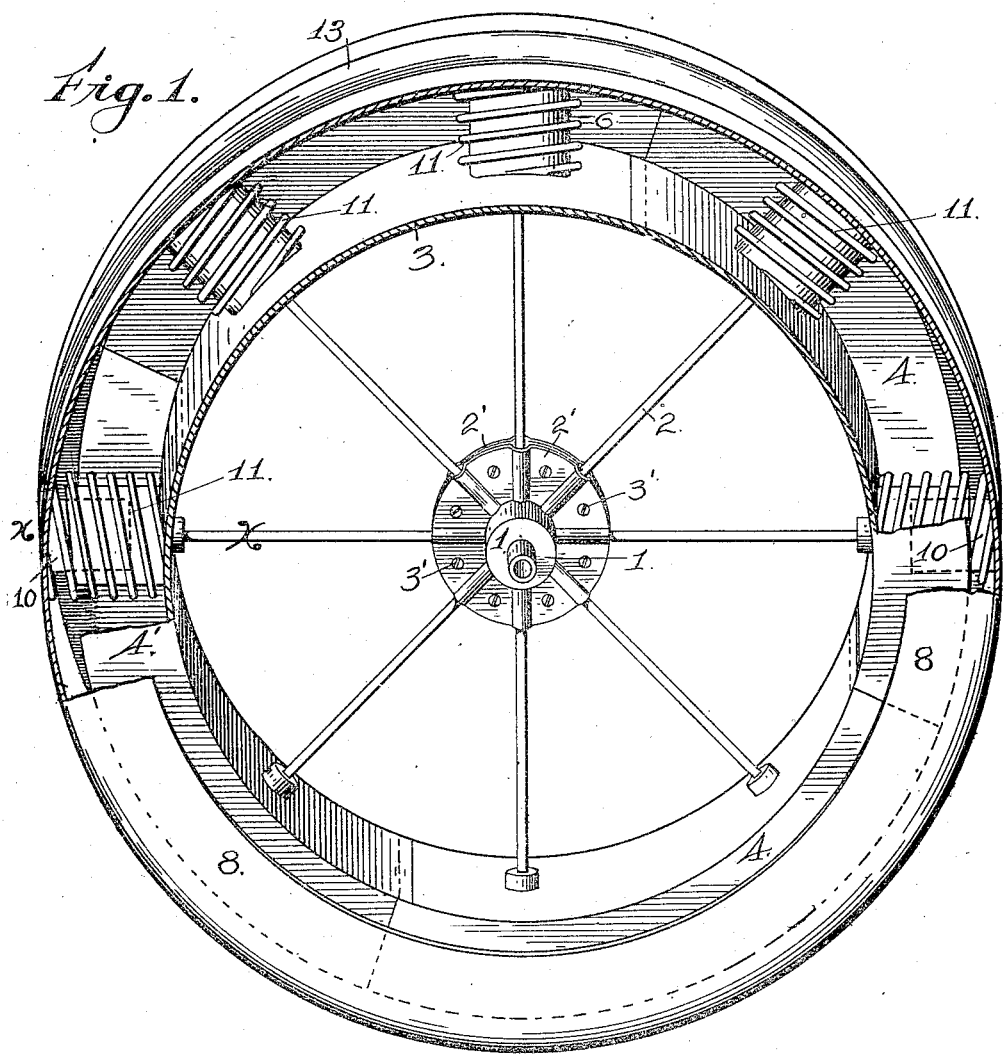
Figure 2:
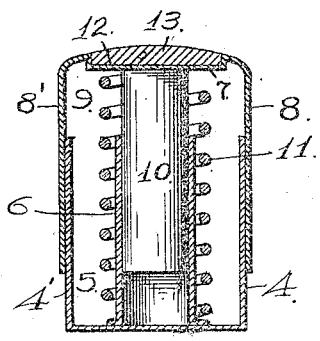

Figure 1 is a perspective view of the improved wheel, one half of the same being in section. Fig. 2 is a horizontal sectional view of the wheel, taken on the line x—x of Fig. 1.

In the drawings, the numeral 1 is used to designate the hub of the wheel, from which radially extend the spokes 2, which, at their outer ends, are united by the circular rim 3. From this rim project the spaced circular flanges 4 and 4', which form an annular channel 5, within which are arranged a series of radially extended tubular guides 6, preferably elliptical in shape, the same projecting from the outer face of the rim 3. The channeled rim thus formed is encircled by the outer bearing rim 7 of the wheel, which rim is formed with the inwardly extending spaced circular flanges 8, 8'. These said flanges form an annular channel 9, within which work the outwardly projecting flanges 4, 4' of the inner rim 3. From the under face of the outer rim 7 inwardly project a series of studs 10, which work within the guides 6. These studs are shaped to conform to that of the guides 6, although somewhat less in width than that of the guides 6, so that the inner rim is permitted to give slightly under the generated strains during compression.

The outer bearing rim is held a given distance from the inner rim by means of the sustaining springs 11, which surround the guides 6 and are projected a slight distance beyond the same, the outer end of each spring bearing against the inner face of the rim 7, and by the pressure exerted thereon maintaining the rim 7 outwardly pressed. These act as elastic cushions for the outer rim and while sufficient to hold the said outer rim a given distance from the inner rim, nevertheless the same will give under the shocking influences of a car to which the wheels are applied when in use and thus present the elastic or resilient properties required of such wheel for automobile purposes.

While the outer rim is permitted to give slightly circumferentially under compression, to the extent of the play provided for the studs 10 within the guide 6, the same is held against lateral movement by reason of the side flanges 8, 8' bearing against the outer faces of the projecting flanges 4, 4' of the inner rim.

To provide against skidding of a car equipped with the described wheels and at the same time overcome the noise incident to a metallic tire contacting with the surface of the roadway, the rim 7 is formed on its outer face with an annular depression 12, of a width substantially equal to the tread surface of a tire, and within the same is securely fitted in a tread rim 13, composed of suitable fiber, which serves as a tread surface for the tire. This tread, when worn, may be removed and replaced by a new tread rim.

A wheel is thus produced which while possessing the advantages of a pneumatic tired wheel, is non-puncturable, less expensive, and more durable than the rubber tires commonly employed for automobiles.

For assembling purposes, the inner rim is made in sections, likewise the hub 1, the circular webs 2' thereof, between which inner end of the spokes 2 are clamped, being secured together by the screw bolts 3'. To detach the wheel, it is only necessary to remove the bolts 3', when the hub 1 separates and the sections of the inner rim may be removed from within the outer rim. Access may thus be had to the interior of the wheel for any desired purpose.

Having thus described the invention what is claimed as new and desired to be protected by Letters Patent is—

1. A vehicle wheel comprising a hub, a channeled rim member carried thereby, a series of radially disposed tubular guide members on the rim of oblong cross section, an outer rim having members slidingly fitted within the said tubular members and of substantially different cross section so as to permit a relative tilting action between the two members, a series of springs between the rims, one surrounding each of said guide members, and means for maintaining the rims in proper relative position against lateral movement.

2. A vehicle wheel comprising an outer rim member the same including a continuous sheet of metal struck up to form side flanges and a peripheral depression intermediate the sides of the periphery thereof, a continuous tread fitted in said depression with the outer surface thereof constituting in effect a continuation of the periphery of said rim at the sides of said depression, separated guide posts fixedly connected to the inner surface of said rim, an inner rim having a base and sides which latter overlap the sides of the outer rim, said inner rim being formed in sections, and guides projecting outwardly from the inner surface of the base of the inner rim sections adapted to overlie said posts, which posts constitute guides in the application of the inner rim sections, and in the relative movement of the rim sections in use, springs interposed between the inner and outer rim, one surrounding each sleeve, spokes fixedly connected at one end to the inner rim sections, and a hub detachably connected to the opposite end of said spokes.

In testimony whereof I have signed my name to this specification in the presence of two subscribing witnesses.

ALEXANDER H. FLOURNOY.

Witnesses:
JULIUS M. ALEXANDER,
BEN. H. BARNES.

Copies of this patent may be obtained for five cents each, by addressing the "Commissioner of Patents, Washington, D. C."